J. REMMEN.
APPARATUS FOR MAKING METAL ARTICLES BY PRESSURE THROUGH DIES.
APPLICATION FILED AUG. 17, 1908.

927,076.

Patented July 6, 1909.
5 SHEETS—SHEET 4.

Witnesses:
Marie Draper
Flora L. Beversdorf

Inventor
Jörgen Remmen
By Attorney
Fredk W Winter

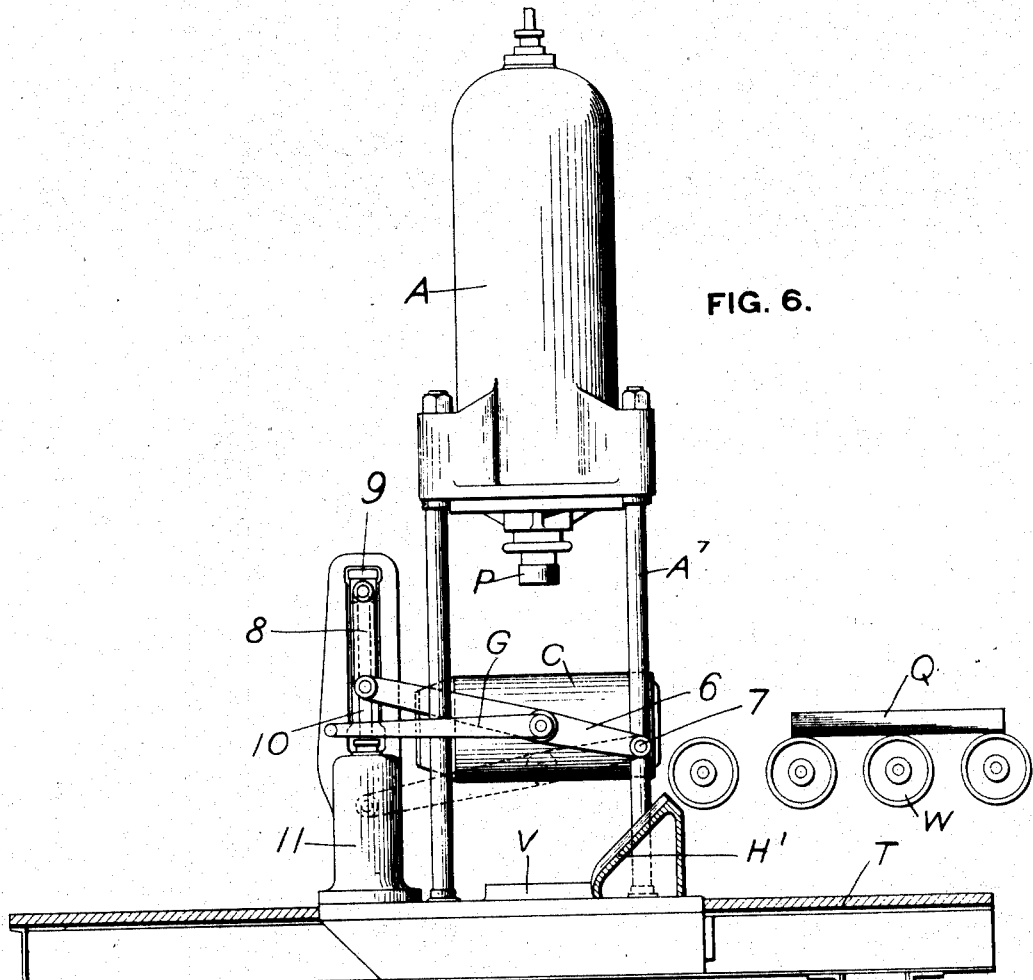
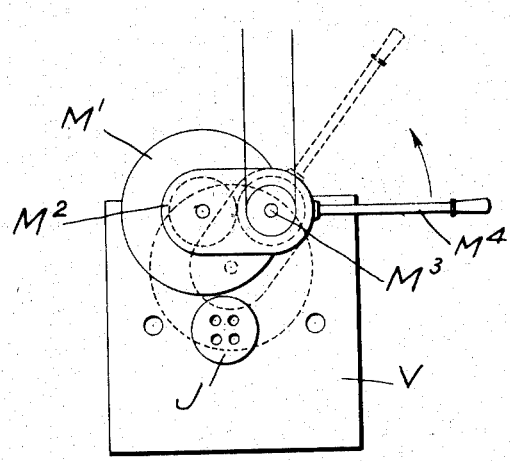

UNITED STATES PATENT OFFICE.

JÖRGEN REMMEN, OF DONORA, PENNSYLVANIA.

APPARATUS FOR MAKING METAL ARTICLES BY PRESSURE THROUGH DIES.

No. 927,076.     Specification of Letters Patent.     Patented July 6, 1909.

Application filed August 17, 1908. Serial No. 448,855.

*To all whom it may concern:*

Be it known that I, JÖRGEN REMMEN, a resident of Donora, in the county of Washington and State of Pennsylvania, have invented a new and useful Improvement in Apparatus for Making Metal Articles by Pressure Through Dies, of which the following is a specification.

This invention relates to apparatus for manufacturing metal articles, such as wire, rods, bars, rails, and other articles, by pressure through a suitable die, and more particularly to the manufacture of such articles by forcing heated steel or iron billets, blooms or ingots through a die.

The object of the invention is to provide simple, efficient and reliable apparatus for this purpose, whereby the cost of manufacture of such articles is greatly reduced, and the amount of oxidation or scale formed is also greatly reduced over existing methods of manufacturing such articles.

Generally stated, the invention comprises a suitable cylinder in which the heated metal is placed, said cylinder being adapted to be held tightly against a suitable base piece in which is contained the apertured die, together with power mechanism, such as a hydraulic cylinder, for forcing the metal out of the cylinder and through the die, and power mechanism for holding the cylinder against the base while it is being discharged and for moving the cylinder away from the die after the metal article is cut off to withdraw the rear portion of the article from the die and to hold the cylinder in such position while the plunger is being advanced to force the residue of metal out of the cylinder.

The invention also comprises suitable means for cooling the article as it emerges from the die in order to prevent oxidation.

The invention also comprises the construction and arrangement of parts hereinafter described and claimed.

Figure 1:
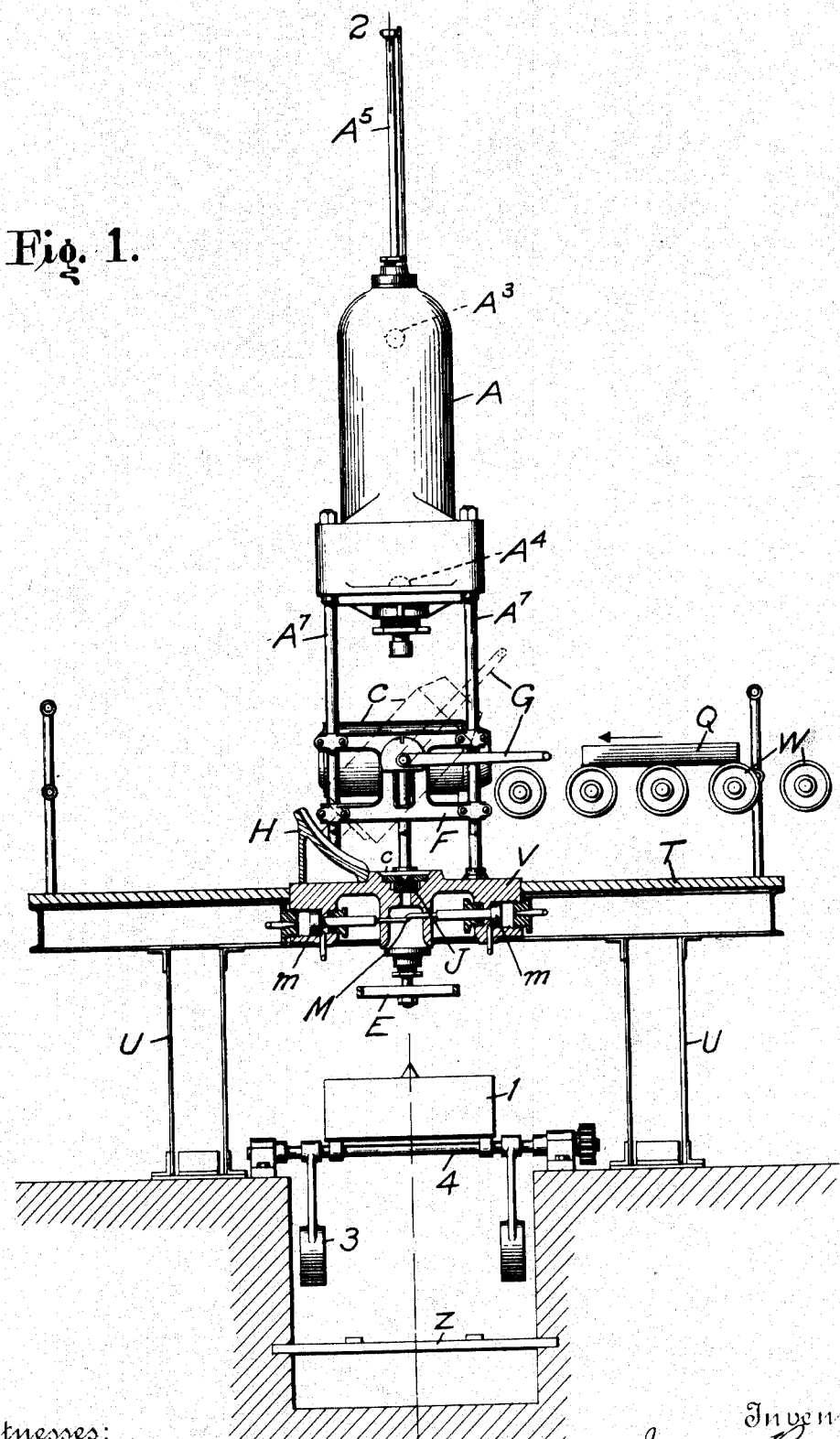
Figure 2:
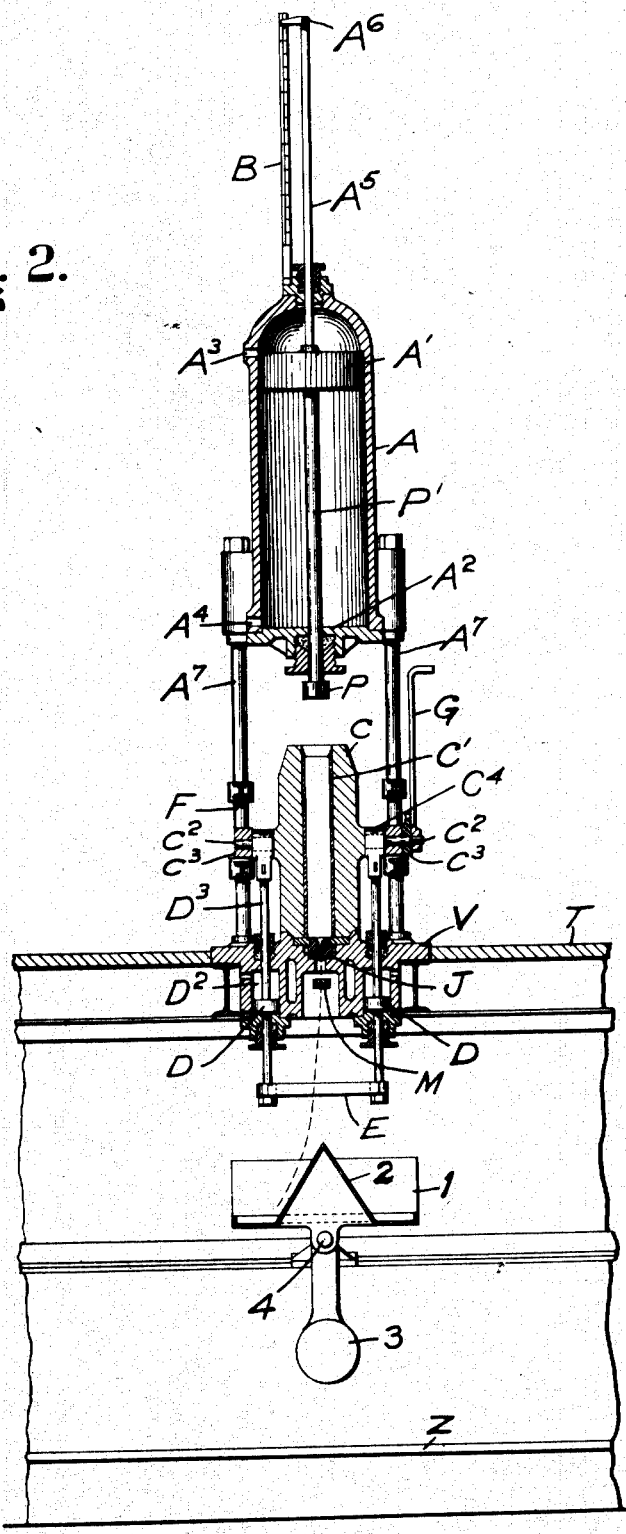
Figure 3:
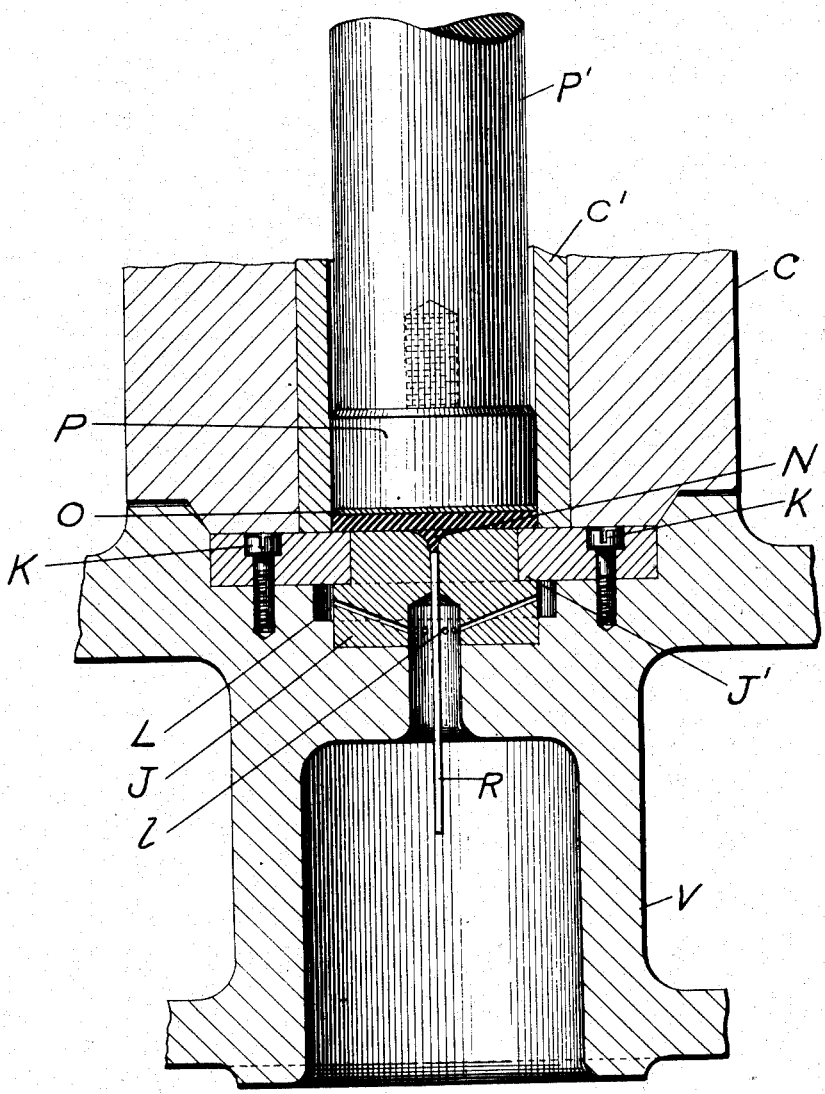
Figure 4:
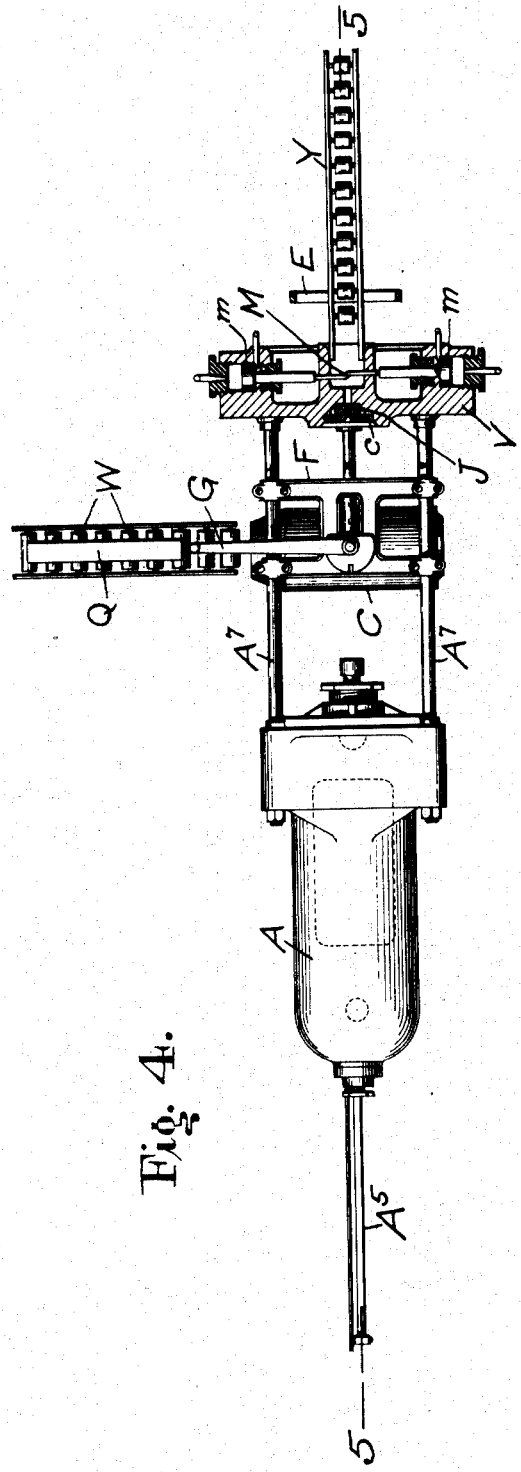
Figure 5:
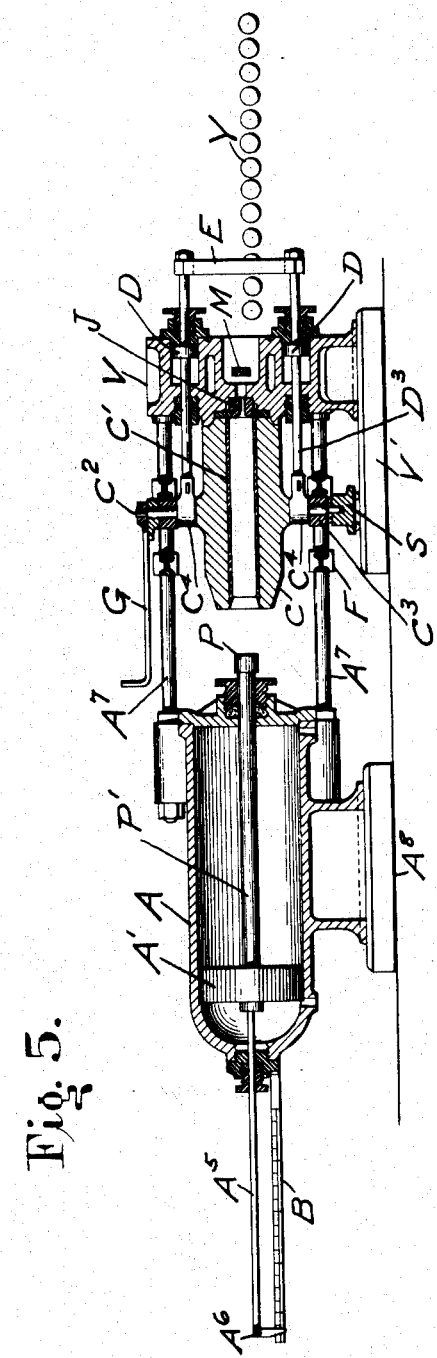

In the accompanying drawings, Figure 1 is an elevation, with the base portion in vertical section, of one form of my apparatus; Fig. 2 is a central vertical section taken on the line 2—2, Fig. 1; Fig. 3 is an enlarged sectional view through the base and die and showing the plunger in side view; Fig. 4 is a plan view, partly in section, showing a horizontally arranged machine; Fig. 5 is a longitudinal vertical section of the same on the line 5—5, Fig. 4; Fig. 6 is a side elevation showing a modified form of vertical machine; and Fig. 7 is a diagrammatic view illustrating a saw for cutting off the article as it emerges from the die.

In the drawings V represents the base piece of the apparatus. This base piece is mounted on a suitable operating platform T, which is supported by the posts U. This base piece is provided with an opening therethrough, and its upper face is provided with a recess receiving the die J, which is provided with a suitable aperture of a size and form corresponding to the desired article to be made. In the case of wire rods and also large articles, such as rails and billets, the die is provided with only a single aperture, but for small bars the die may be provided with a plurality of apertures, as shown in Fig. 7. The die is held in position by means of a ring J', which rests upon an annular shoulder formed on the die, and is clamped to the base by suitable means, such as the lag screws K. If desired, the ring J', may be an integral part of the die, but the construction shown in the drawings is preferred.

Connected to the base are suitable standards or columns $A^7$, which at their upper or outer ends, depending upon whether it is a vertical or a horizontal machine, pass through suitable lugs on the hydraulic cylinder A, and are secured to the latter by nuts on their outer ends, as is the common practice in the construction of hydraulic presses. Working in the cylinder A, is a piston A', to which is connected the piston rod P', which passes through a suitable stuffing box in the head of the cylinder, and at its outer end carries the plunger proper P. The latter is shown as slightly larger than the piston rod, and separable therefrom, being secured thereto by the threaded connection shown in Fig. 3, in order to permit said plunger to be removed and replaced when necessary. The cylinder A, is of the double acting type, being provided with water connections both above and below the piston, as shown at $A^3$ and $A^4$ respectively.

Secured to the standards or columns $A^7$, are cross frames or guides F. These are slotted, and in the slotted portion are movably mounted blocks $C^3$, in which are journaled trunnions $C^2$, of the metal receiving cylinder C. The latter is provided with a bore open at both ends, in which is the removable lining $C^y$, made of tungsten steel or other metal of different character from the cylinder in order to more effectively resist heat and wear and permit repair and renewal without discarding the entire cylinder. The lower or base end of the cylinder is shaped to fit into a tapering recess $c$, in the base. The cylinder is adapted to tilt about the trunnions $C^2$, and in order to tilt the same, one of said trunnions has connected thereto a long lever G.

Loosely embracing the trunnions are heads $C^4$, which are secured to the ends of piston rods $D^3$. Pistons D, are secured to these piston rods and work in cylinders $D^2$, formed in the base V. In order to cause both of these piston rods to move in unison, their outer ends are connected by a suitable frame or yoke E, which is annular so as not to interfere with the product escaping from the die. The cylinders $D^2$, are also double acting; that is, provided with fluid inlets both above and below the pistons so that by means thereof the cylinder C, can not only be lowered and held tightly against the base when being discharged of the metal contained therein, but can also be positively lifted from the base and held above the same.

Fig. 6 shows a modification wherein the cylinder C, has its trunnions mounted in levers 6, fulcrumed at one end, as at 7, and have their opposite ends connected by links 8, to a cross-head 9, carried on the upper end of a piston rod 10, of a suitable power cylinder 11. This cylinder likewise is of the double acting type, so that the cylinder C, can be either raised as stated, or held tightly against the base.

In order to charge the cylinder C, with a heated billet, bloom or ingot, said cylinder is swung to horizontal position, as shown in Figs. 1 and 6, and the heated bloom or ingot Q is delivered into the same by the delivery mechanism W, shown as a series of rolls. The cylinder is then swung back into line with the plunger P, and in order to prevent the billet, bloom or ingot from falling out of the cylinder when being swung into position, a suitable guide is provided, which may be either a curved or arc shaped guide H, as shown in Fig. 1, or a straight inclined guide $H^1$, shown in Fig. 6.

Figs. 4 and 5 show a horizontally arranged machine in which the guide H or $H^1$ is dispensed with. In this machine the cylinder is swung in a horizontal plane through about ninety degrees, instead of through a vertical plane, as in the form of mechanism shown in Figs. 1, 2 and 6. The horizontal form of mechanism is preferred when making heavy articles, such as rails and heavy bars or rods. In this case a suitable delivery mechanism, such as the rolls Y, is preferably employed, whereas for making small articles the vertical machine shown in Figs. 1, 2 and 6 can be advantageously employed. When making wire or rods for wire, on the vertical machine, a suitable coiling device is employed, the drawings showing a well-known construction 1, in which the wire is coiled around a cone 2. The coiling device is mounted on a shaft 4, and held in vertical position by weights 3. When the wire from one billet has been run out and severed, the coiling device is turned on its shaft to discharge the coil on to a conveyer Z, arranged below the coiling device.

In the horizontal machine illustrated, the hydraulic cylinder A, is supported on a suitable base $A^8$, and is held in alinement with the cylinder C, by the standards or columns $A^7$, which serve as tie rods to tie together the hydraulic cylinder and base. The cylinder C, is supported by the thrust bearing S, running on the support, which also carries the base V.

With the form of apparatus described, it is never possible to entirely empty the cylinder C, but there always remains a slight amount of metal N, or more properly, scale, therein. I provide suitable cutting-off mechanism below the die J, which mechanism is shown in Figs. 1 to 5, as shear members M, mounted in the base V, and actuated by pistons $m$, these shear members being arranged to intercept the article emerging from the die. Fig. 7 shows for the same purpose a saw M', carried on a swinging frame $M^2$, swinging about the point $M^3$ and actuated by any suitable mechanism, such as the lever $M^4$, to traverse the path of the article or articles emerging from the die J, and sever the same.

In order to prevent the plunger from adhering to the hot metal under the high pressure necessary, I provide between the metal and said plunger, a suitable non-fusible washer, such as shown at O, and which may be composed of asbestos or any other suitable non-fusible material.

Surrounding the die J, is an annular channel L, which is connected to a suitable source of water. This channel is connected to small ports $l$, extending through the die in such position that the water emerging therefrom will impinge against the article R, coming through the die. This arrangement serves not only to keep the die cool, but also to very rapidly and materially cool the article emerging from the die. Since the metal is raised to a very high temperature, practically to the white heat of iron or steel, its affinity for oxygen is very great, so that there would be a large amount of oxidation when the formed article encountered the air. By quickly cooling the same oxidation is prevented to a very large extent. The water for cooling the article may, if desired, be supplied by means entirely independent of the means for cooling the die.

Connected to the piston A, and projecting through a stuffing box in the upper or outer head of the cylinder A, is a rod $A^5$, which at its upper end carries a pointer $A^6$, working over a graduated scale B, so that the extent of movement of the plunger P, or its position in the cylinder C, can readily be ascertained, and unnecessary or excessive movement of said plunger avoided. In the operation of the cylinder A, preferably water under low pressure is used to withdraw the piston and also to advance said piston until the plunger impinges against the metal in the cylinder C, after which water of higher pressure is employed to force the metal out of the cylinder and through the die. In this way economy in power is secured.

The plunger P, fits the bore of the cylinder C, closely. The lining C', is made of any suitable metal to withstand both the high temperature and the high pressure to which the cylinder is subjected. It can be readily removed, so that when worn it can be entirely replaced by a new lining or can be bored out to again make the same smooth and true. In case it is re-bored, the plunger P, must be replaced by one correspondingly larger, and this can be readily effected by the threaded connection between the same and the piston rod P'.

The operation of the apparatus is as follows: The billet, bloom or ingot Q, raised to the required temperature, preferably a white heat, is brought on the conveyer W. The cylinder C, is turned on its trunnions to present one of its ends toward the conveyer, so that the billet, bloom or ingot is thereby fed into the cylinder. The cylinder is then swung back into alinement with the die and plunger. With an upright machine the cylinder is swung into vertical position, while with a horizontal machine it remains in the horizontal position. The cylinder is then lowered or moved toward the base V, by admitting water under pressure on top of the pistons D, and by means of these, the cylinder C, is forced tightly against the base V, the delivery end thereof fitting snugly in the tapered recess c, in the base. The asbestos washer O, is then placed on top of the billet, after which water under pressure is admitted to the piston A', by means of which the plunger is forced into the bore of the cylinder C, with a powerful pressure. This serves to force the hot metal out of the delivery end of the billet cylinder C, and through the opening in the die J, forming a wire, rod, bar, rail or other article, according to the shape of the aperture in the die. Where wire or thin rods are produced, as in the apparatus shown in Figs. 1 and 2, they are wound upon the coiling device 1, whereas with heavier articles, such as shown in Figs. 4 and 5, the finished product is carried away by the conveyer rolls Y. As soon as the metal of a billet, bloom or ingot has been forced out of the cylinder C, as far as possible, or until only a small amount of metal N, which is largely scale, remains in the cylinder, the article is severed below the die either by means of the shears or saw illustrated. The plunger P, is then partly withdrawn from the billet chamber, after which the cylinder C, is moved away from the base by means of the power cylinders $D^2$. Inasmuch as the residue N, adheres tightly to the cylinder C, this action serves to draw the severed end of the article out of the die. The cylinder C, is raised until this end of the article is entirely clear of the die, after which the plunger P, is again forced forward in the cylinder C, and clears the same from the metal remaining therein. After the metal has been ejected, the plunger P, is entirely withdrawn from the cylinder C, which can again be turned by the handle G, into position to receive another charge.

While the apparatus has been described more particularly for the manufacture of wire, rods, bars, rails, billets, blooms, etc., it can be used for manufacturing articles of various kinds, such, for instance, as seamless tubes, in which case it is merely necessary to arrange in line with the opening in the die, a mandrel or core against which the hot metal is forced when it is discharged.

By means of the apparatus described, metal articles of the character named can be economically manufactured with a minimum amount of power, it requiring much less power to force the metal through the die than to operate the successive rolls which are necesssary in order to reduce the billet, bloom or ingot to an article of the kind formed by the die. It also effects a large saving in skilled labor. Oxidation is also largely prevented, as there is only a single heating and a single reduction, and the article is cooled below the point of oxidation as soon as it emerges from the die.

What I claim is:

1. In an apparatus of the character specified, the combination of a base, an apertured die therein, a metal receiving cylinder adapted to fit against said base, power cylinders arranged to hold said metal receiving cylinder tightly against the base and to move the same away therefrom, and a power plunger in alinement with said cylinder and arranged to force the metal out of the same and through the die.

2. In the apparatus of the character specified, the combination of a base, an apertured die therein, a metal receiving cylinder adapted to fit against said base, double acting hydraulic cylinders arranged to hold said metal cylinder tightly against said base and to move the same away therefrom, a plunger in alinement with said metal receiving cylinder and arranged to force the metal out of the same and through the die, and a hydraulic cylinder arranged to actuate said plunger.

3. In apparatus of the character specified, the combination of the base, an apertured die therein, a metal receiving cylinder adapted to fit against said base, power cylinders for holding said cylinder tightly against said base and for moving the same away therefrom, trunnions on which said cylinder is mounted to tilt in order to receive a charge, and a power plunger in alinement with said cylinder and arranged to force the metal out of the same and through the die.

4. In apparatus of the character specified, the combination of a base, an apertured die therein, a metal receiving cylinder adapted to fit against said base, releasable power mechanism arranged to hold said metal receiving cylinder tightly against the base, power mechanism for moving said cylinder away from the base, and a power plunger in alinement with said cylinder and arranged to force the metal out of the same and through the die.

5. In apparatus of the character specified, the combination of a base, an apertured die therein, a metal receiving cylinder arranged to fit against said base and mounted to tilt to a horizontal position, power mechanism for holding said cylinder tightly against said base and for moving the same away therefrom, a conveyer at the side of said apparatus in line with the cylinder when in a horizontal tilted position and arranged to supply metal to said cylinder, and a power plunger arranged to force the metal out of said cylinder and through the die.

6. In apparatus of the character specified, the combination of a base, an apertured die therein, a metal receiving cylinder adapted to fit against said base, severing means on the opposite side of said die, a power plunger arranged to force the metal out of the cylinder and through the die, and power mechanism arranged to hold said cylinder tightly against the base and to move the same away therefrom to extract the metal from the die.

7. In apparatus of the character specified, the combination of a base, an apertured die therein, a metal receiving cylinder adapted to fit against said base, severing means on the opposite side of said die, a power plunger arranged to force the metal out of the cylinder and through the die, power mechanism arranged to hold the cylinder tightly against the base and move the same away therefrom to extract the metal from the die, and trunnions on which said cylinder is mounted to tilt.

8. In apparatus of the character specified, the combination of a base, an apertured die therein, a metal receiving cylinder adapted to fit against said base, severing means on the opposite side of said die, releasable power mechanism arranged to hold said cylinder tightly against the base, a power plunger arranged to force the metal out of the cylinder and through the base, and mechanism arranged to move the cylinder away from the base to extract the metal from the die and to hold said cylinder away from the base to permit the plunger to force the residue of metal out of the same.

9. In apparatus of the character specified, the combination of a base, an apertured die therein, a metal receiving cylinder adapted to fit against said base, power mechanism arranged to hold said cylinder tightly against said base and to move the same away therefrom, a power plunger in alinement with the base and arranged to force the metal out of the same and through the die, and a nonfusible washer arranged to be placed between the plunger and metal.

10. In apparatus of the character specified, the combination of a base and a die therein, provided with an aperture through which the metal is forced and beyond said aperture with an enlarged space, a metal receiving cylinder adapted to fit against said base, a power plunger arranged to force the metal out of the cylinder and through the die, and means for projecting a cooling medium onto the metal after it emerges from the aperture in the die.

11. In apparatus of the character specified, the combination of a base and a die therein, provided with an aperture through which the metal is forced and with an enlarged space beyond said aperture, a metal receiving cylinder adapted to fit against said base, and a power plunger arranged to force the metal out of the cylinder and through the die, said base and die being provided with a water circulating space to cool the die and having passages leading from said water circulating space in position to project the water against the metal after it emerges from the aperture in the die.

In testimony whereof, I have hereunto set my hand.

JÖRGEN REMMEN.

Witnesses:
G. V. SLORIGI,
CLYDE T. LEWIS.